United States Patent
Gottemoller et al.

(10) Patent No.: US 6,912,852 B2
(45) Date of Patent: Jul. 5, 2005

(54) METHOD FOR ENGINE CONDITION CONTROL WITH TURBOCOMPRESSOR CONTROLLABLE BYPASS

(75) Inventors: Paul Gottemoller, Palos Park, IL (US); Ramesh B. Poola, Naperville, IL (US); David Corba, Des Plaines, IL (US); John R. Zagone, Westmont, IL (US)

(73) Assignee: Electro-Motive Diesel, Inc., LaGrange, IL (US)

( * ) Notice: Subject to any disclaimer, the term of this patent is extended or adjusted under 35 U.S.C. 154(b) by 0 days.

(21) Appl. No.: 10/762,590

(22) Filed: Jan. 22, 2004

(65) Prior Publication Data

US 2004/0250541 A1 Dec. 16, 2004

Related U.S. Application Data

(63) Continuation-in-part of application No. 10/106,093, filed on Mar. 26, 2002, now abandoned.

(51) Int. Cl.[7] .......................... F02B 33/44; F02B 37/20
(52) U.S. Cl. ........................................ 60/606; 60/611
(58) Field of Search ................... 60/606, 611; 123/563, 123/564

(56) References Cited

U.S. PATENT DOCUMENTS

| | | | | |
|---|---|---|---|---|
| 4,356,696 A | * | 11/1982 | Mason | 60/606 |
| 4,367,626 A | * | 1/1983 | Schwartzman | 60/606 |
| 4,464,901 A | * | 8/1984 | Kobayashi et al. | 60/606 |
| 4,517,802 A | * | 5/1985 | Kobayashi et al. | 60/606 |
| 4,833,886 A | * | 5/1989 | Meier | 60/606 |
| 6,134,888 A | * | 10/2000 | Zimmer et al. | 60/600 |
| 6,276,139 B1 | * | 8/2001 | Moraal et al. | 60/606 |
| 6,470,864 B2 | * | 10/2002 | Kim et al. | 60/606 |

FOREIGN PATENT DOCUMENTS

| | | | | |
|---|---|---|---|---|
| DE | 3225867 A1 | * | 1/1984 | 60/606 |
| DE | 3539578 A1 | | 6/1986 | 60/606 |
| DE | 4439573 A1 | | 5/1996 | F02B/37/20 |
| EP | 0038232 A2 | | 3/1981 | 60/606 |
| EP | 0210100 A1 | | 7/1986 | 60/606 |
| GB | 2003226 A | * | 3/1979 | 60/606 |
| JP | 03037328 A | * | 2/1991 | 60/606 |

OTHER PUBLICATIONS

EPO Search Report for EP Application 03001192.8 dated Nov. 22, 2004.

* cited by examiner

*Primary Examiner*—Thai-Ba Trieu
(74) *Attorney, Agent, or Firm*—Cook, Alex, McFarron, Manzo, Cummings & Mehler, Ltd.

(57) ABSTRACT

A system for a turbocharged internal combustion engine includes an engine having a charge inlet connected to the compressor outlet and an exhaust outlet connected to the turbine inlet for driving the turbocharger with hot exhaust gas and supplying compressed air to the engine for combustion. A bypass duct connects the compressor outlet to the turbine inlet for diverting a portion of the compressed air around the engine to the turbine inlet or exhaust. A control device selectively controls the diversion of air. An operating method for the system involves controlling peak cylinder firing pressure and/or maximum turbine inlet temperature, optionally with exhaust NOx and smoke in order to limit these variables to acceptable limits with a minimum of operational limitations.

10 Claims, 2 Drawing Sheets

METHOD FOR ENGINE CONDITION CONTROL WITH TURBOCOMPRESSOR CONTROLLABLE BYPASS

CROSS-REFERENCE TO RELATED APPLICATIONS

This application is a Continuation-In-Part of U.S. patent application Ser. No. 10/106,093 filed Mar. 26, 2002 now ABN.

TECHNICAL FIELD

This invention relates to turbocharged internal combustion engines, such as diesel engines, and more particularly to a system and method for controlling peak cylinder pressures and/or exhaust emissions and providing certain operational and performance advantages.

BACKGROUND OF THE INVENTION

For a given engine size and hardware, the maximum allowable peak cylinder firing pressure and turbine inlet (engine exhaust gas) temperature are generally defined during the component design process to limit engine operation below these threshold values. However, there is apparently no closed loop control strategy existing now to monitor and control these parameters during actual engine operation. Limiting engine operation within the allowable (pre-defined) peak firing cylinder pressure and turbine inlet temperature avoids excessive mechanical and thermal loads on the components and consequent damage to the engine.

Conceivably, one could monitor the peak firing cylinder pressure and turbine inlet temperature directly and change the engine operation such that the engine doesn't exceed these values. However, it is believed that no such control strategy exists or has been practiced. Furthermore, temperature sensors generally do not survive in such high temperatures and harsh environments for long periods of operation.

There are also turbocharged diesel engine operating conditions which produce a higher cylinder trapped oxygen content than is required for efficient combustion. Typically, this results in higher NOx production because of the resulting higher peak pressure in the cylinders and increased oxygen available to combine with free nitrogen.

It has been proposed to use a turbocharger compressor bypass system, controlled to bypass combustion air from the compressor to the inlet or outlet of the turbocharger turbine and thereby increase compressor air flow when needed to avoid compressor surge during certain transient engine operating conditions. An engine controller responds to signals indicating changes in atmospheric pressure, intake manifold pressure and engine speed to control a bypass valve and prevent the turbocharger from surging. However, a method and application of a compressor bypass system for controlling other engine conditions has apparently not been proposed.

A system and method for controlling cylinder peak firing pressure and turbine inlet temperature, and further controlling particular engine exhaust emissions is desired.

SUMMARY OF THE INVENTION

The present invention makes use of a compressor bypass system which differs from prior systems in control parameters and equipment as well as in methods of operation and control functions. In particular embodiments, the bypass system is operated to limit engine peak cylinder firing pressure and/or turbine inlet temperature and, optionally, to limit emissions of nitrogen oxides (NOx) and smoke in the engine exhaust gases.

A control method of the present invention operates to continuously monitor the engine combustion (intake manifold) air density and peak firing pressure, and control the combustion air quantity supplied to the engine such that the engine will always operate under the maximum allowable peak cylinder firing pressure and/or turbine inlet temperature. Controlling the amount of charge air rather than the amount of fuel injected provides much faster dynamic response in changing the engine operating conditions without reducing the engine load or causing load swings.

In a preferred embodiment for controlling cylinder peak firing pressure by varying pressurized air flow to the engine, the method includes:

sensing inlet charge air pressure and charge air temperature;

obtaining the values of fuel injection timing, engine speed and load;

determining current peak firing pressure;

computing charge air density and turbocharger turbine inlet temperature;

transmitting charge air density, turbine inlet temperature and peak firing pressure to an electronic bypass valve control unit (BVCU);

comparing transmitted values of turbine inlet temperature and peak firing pressure with allowable maximums of these values stored in the BVCU; and controlling the bypass valve to divert around the engine a sufficient portion of pressurized air from a turbocharger compressor outlet to maintain peak firing pressure within the maximum allowable value.

The method may be varied to control other engine conditions, such as turbine inlet temperature, NOx exhaust emissions or exhaust smoke, by including additional engine characteristics from which desired changes in air flow control may be determined.

In operation, the method involves diverting a portion of the compressor discharge air around the charge air cooler and engine cylinders and re-injecting the compressed air prior to the turbine inlet. The bypassed air may be directed through the engine exhaust header or manifold, if provided.

The bypass duct around the charge air cooler and engine is provided with a control valve to limit air flow through the bypass to a desired value. The valve may be a three way valve operated by suitable controls responsive, for example, to charge air density, peak firing pressure, turbine inlet temperature and NOx and smoke levels, to determine the proper setting of the bypass control valve.

The bypass system may be utilized under various engine operating conditions to reduce cylinder pressures as well as to lower cylinder oxygen content, both of which will result in the production of lower NOx emissions. The bypass of compressor air directly into the engine exhaust manifold can reduce manifold exhaust temperature and lower the NOx present in the exhaust.

The method can be used to limit peak cylinder firing pressures. It can also improve turbine life by limiting maximum turbine inlet temperatures. The method can additionally recover a large percentage of the compressor discharge energy by passing the compressed air through the turbine. Further, the reduced air flow through the engine reduces the cooling load on the charge air cooler, providing for more efficient system operation.

These and other features and advantages of the invention will be more fully understood from the following description of certain specific embodiments of the invention taken together with the accompanying drawings.

DESCRIPTION OF THE PREFERRED EMBODIMENT

Figure 1:
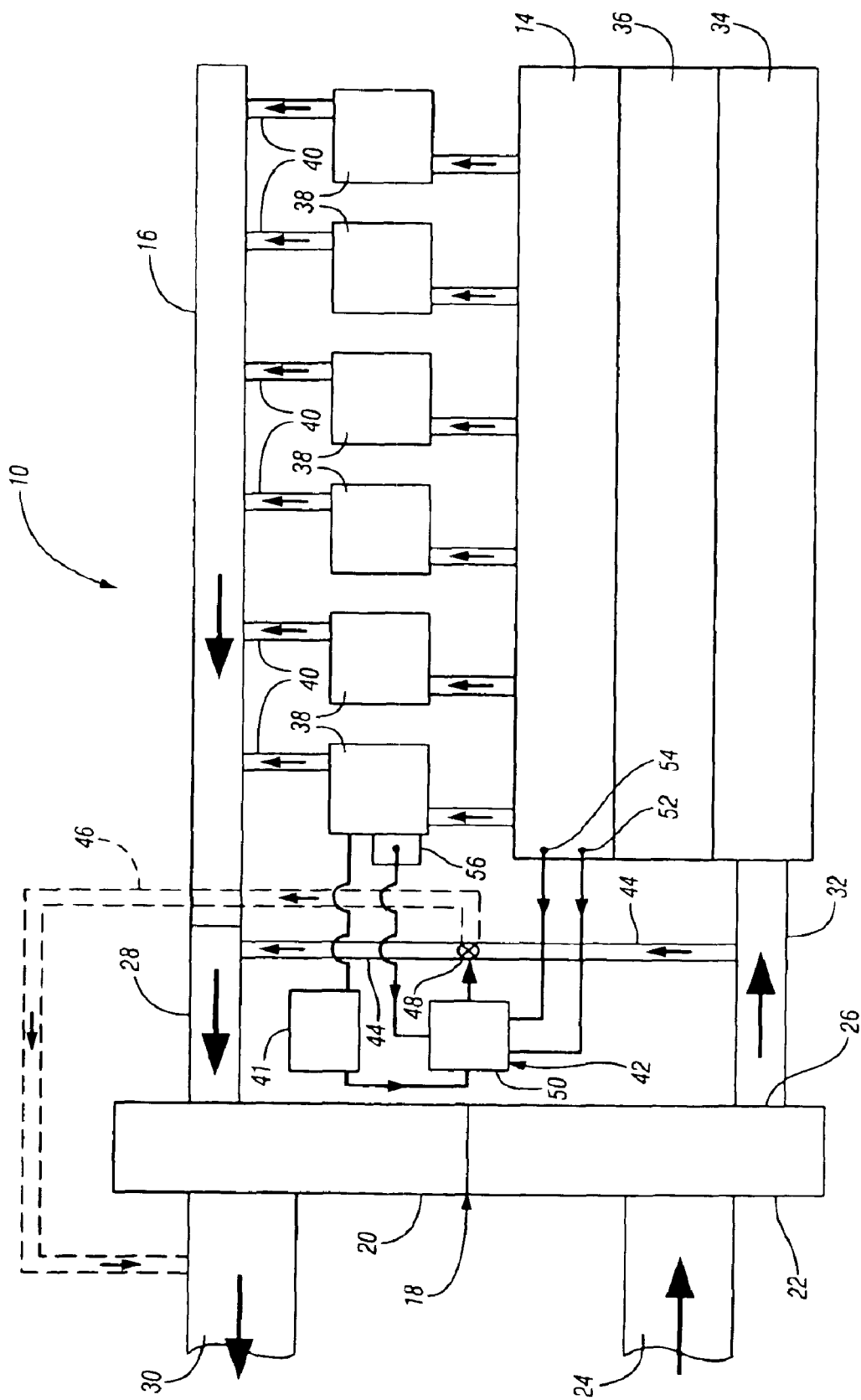
FIG. 1 is a schematic view of an engine including a turbocharger and a system for controlling various engine operating conditions in accordance with the invention.

Referring now to the drawings in detail, numeral 10 generally indicates an internal combustion engine, such as a diesel engine for railroad locomotives, marine applications and other uses. Engine 10 includes a charge air inlet or manifold 14, and an exhaust outlet including an engine exhaust manifold 16. A turbocharger 18 is mounted on or adjacent to the engine and includes internally a turbine 20 driving a compressor 22.

The compressor 22 includes an ambient air inlet 24 and a compressed air outlet 26. The turbine 20 includes an exhaust gas inlet 28 and an exhaust discharge or outlet 30.

The compressor outlet 26 is conventionally connected through a duct 32 with an inlet header 34 for a charge air cooler 36. The air cooler 36 discharges to the manifold 14 which delivers cooled compressed inlet air to the engine cylinders 38. The engine cylinders discharge through one or more exhaust outlets 40 to the exhaust manifold 16, which carries the engine exhaust gas to the inlet 28 of the turbine for driving the turbocharger. The spent exhaust gas is discharged through the turbine exhaust 30.

The engine 10 is typically provided with an electronic control unit (ECU) 41 for controlling fuel injection quantity and timing in response to various input conditions, including engine speed and load.

In accordance with the invention, the engine 10 also includes a compressor bypass system 42. In addition to the elements described above, the bypass system 42 includes a bypass duct 44, which connects the turbocharger compressed air outlet 26 directly with the turbine exhaust gas inlet 28. An alternative or secondary bypass duct 46 may be provided to optionally connect the compressed air outlet 26 with turbine exhaust outlet 30 which discharges to the atmosphere.

The bypass duct 44 has mounted therein a bypass control valve 48, which is preferably operated by an electronic bypass valve control unit (BVCU) 50. Control 50 may be actuated in response to specific operational data computed from information provided by the ECU 41 or supplied by direct readings of instruments, such as charge air temperature and pressure sensors 52, 54 and a peak cylinder firing pressure sensor 56.

In a first position, the valve 48 closes the bypass 42 to direct all of the compressed combustion air output of the compressor through the charge air cooler to the engine cylinders. In a second position, valve 48 opens to bypass a portion of the combustion air through duct 44 to the turbine inlet 28. In a third position, valve 48 closes the outlet of duct 44 and opens to bypass a portion of the combustion air to the turbine exhaust outlet 30.

In operation of the engine, especially at higher load conditions, the turbocharger may provide greater air pressure and flow than is needed in order to properly burn the fuel supplied to the engine. This may result in the cylinder peak firing pressures approaching values above those at which the engine is intended to operate.

To protect against excessive peak pressures, the bypass system 42 is programmed to open the bypass duct 44 for one or more time periods sufficient to reduce the engine charge pressure sufficiently to prevent overpressuring the cylinders.

Figure 2:
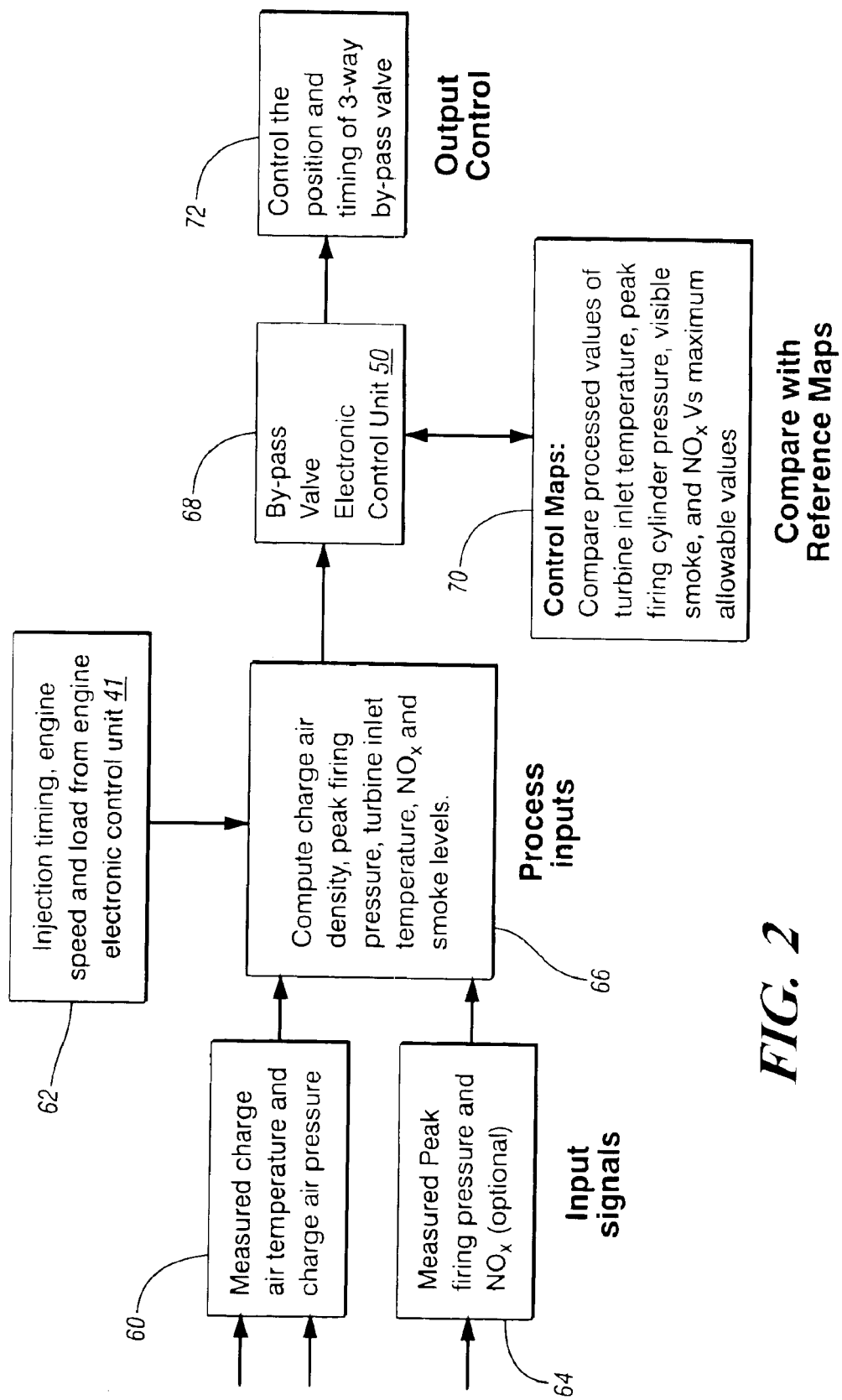
FIG. 2 is a flow diagram illustrating methods for controlling operational engine characteristics, such as cylinder peak firing pressures, turbine inlet temperatures and emissions of NOx and smoke.

Preferred methods for limiting peak firing pressures may include the steps shown in the flow chart of FIG. 2. These include:

sensing measured inlet charge air pressure and charge air temperature as in box 60;

obtaining fuel injection timing, engine speed and load from the ECU as in box 62;

determining current peak firing pressure by measurement as in box 64 or computation as in 66;

computing charge air density and turbine inlet temperature as in box 66;

transmitting charge air density, turbine inlet temperature and peak firing pressure to an electronic bypass valve control unit (BVCU), box 68;

comparing transmitted values of turbine inlet temperature and peak firing pressure with allowable maximums of these values in control maps stored in the BVCU, box 70; and controlling the bypass valve, box 72, to divert a sufficient portion of compressed air from a compressor outlet 26 (FIG. 1) around the engine to maintain at least one of peak firing pressure and turbine inlet temperature within the maximum allowable values.

Bypassing a portion of the compressor discharge air around the charge air cooler and engine immediately reduces air flow through the charge air cooler and engine cylinders so that the thermal load on the charge air cooler is lowered. Also, air trapped in the engine cylinders is reduced. Lowering cylinder peak firing pressures and reducing oxygen in the cylinder charges results in lower production of oxides of nitrogen (NOx). At the same time, the energy of the bypassed compressor air adds to the exhaust energy entering the turbine 20 of the turbocharger so that the energy is used in maintaining the turbocharger speed prior to discharging to atmosphere with the other exhaust gases through the turbine exhaust discharge 30.

Considered generally as a method, the present invention involves operating the control valve in the bypass duct to reduce engine cylinder pressures and temperatures. It can also control air flow through the charge air cooler to obtain reductions in engine created NOx and to lower the cooling load in the charge air cooler where such operation may prove of benefit in conserving energy or controlling emissions. The method may be modified, by the inclusion of NOx (measured or computed) or smoke emission conditions and allowable values, to operate the control valve to directly limit these values for emission control purposes.

Many of the purposes of the method variations disclosed herein could be obtained by reducing engine power by controlling fuel flow to the cylinders. However, controlling the amount of charge air rather than the amount of fuel injected provides much faster dynamic response in changing the engine operating conditions and does not require reducing the engine load or cause load swings.

While the invention has been described by reference to certain preferred embodiments, it should be understood that numerous changes could be made within the spirit and scope of the inventive concepts described. Accordingly, it is intended that the invention not be limited to the disclosed embodiments, but that it have the full scope permitted by the language of the following claims.

What is claimed is:

1. A method of controlling peak firing pressure and turbine inlet temperature in a diesel engine having a turbocharger, the method comprising:

sensing inlet charge air pressure and charge air temperature;

obtaining fuel injection timing, engine speed and load;

determining current peak firing pressure;

computing charge air density and turbine inlet temperature;

transmitting charge air density, turbine inlet temperature and peak firing pressure to an electronic bypass valve control unit (BVCU);

comparing transmitted values of the turbine inlet temperature and the peak firing pressure with allowable maximums of these values stored in the BVCU; and controlling the bypass valve to divert a sufficient portion of compressed air from a compressor outlet around the engine to maintain at least one of the peak firing pressure and the turbine inlet temperature within maximum allowable values.

2. A method as in claim 1 wherein the obtaining step includes obtaining the fuel injection timing, engine speed and load from an engine control unit.

3. A method as in claim 1 wherein the determining step includes measuring the peak firing pressure.

4. A method as in claim 1 wherein the determining step includes computing the peak firing pressure.

5. A method as in claim 4 wherein the peak firing pressure is computed from engine parameters, the engine speed, the computed charge density and the fuel injection timing.

6. A method as in claim 1 wherein the turbine inlet temperature is computed from the computed charge air density, the engine speed, the engine load and the fuel injection timing.

7. A method as in claim 1 including:

determining a NOx exhaust emission value and transmitting the NOx exhaust emission value to the BVCU, and controlling the bypass valve to divert a sufficient portion of compressed air from the compressor outlet around the engine to maintain NOx exhaust emissions within maximum allowable values stored in the BVCU.

8. A method as in claim 1 including:

determining a visible exhaust smoke value;

transmitting the visible exhaust smoke value to the BVCU, and controlling the bypass valve to divert a sufficient portion of compressed air from the compressor outlet around the engine to maintain allowable smoke emissions within maximum allowable values stored in the BVCU.

9. A method as in claim 1 including conducting compressed air diverted around the engine to a turbine inlet of the turbocharger to utilize the energy in the diverted gas to maintain compressor speed while reducing the temperature of exhaust gas driving the turbine.

10. A method as in claim 1 including conducting compressed air diverted around the engine to an engine exhaust outlet to maximize the effectiveness of the controlling step.

* * * * *